(12) United States Patent
Satpathy et al.

(10) Patent No.: US 11,695,542 B2
(45) Date of Patent: Jul. 4, 2023

(54) TECHNOLOGY FOR GENERATING A KEYSTREAM WHILE COMBATTING SIDE-CHANNEL ATTACKS

(71) Applicant: Intel Corporation, Santa Clara, CA (US)

(72) Inventors: Sudhir Satpathy, Redmond, WA (US); Vikram Suresh, Portland, OR (US); Sanu Mathew, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 727 days.

(21) Appl. No.: 16/288,536

(22) Filed: Feb. 28, 2019

(65) Prior Publication Data

US 2019/0199517 A1    Jun. 27, 2019

(51) Int. Cl.
   *H04L 9/06*    (2006.01)
   *H04L 9/00*    (2022.01)

(52) U.S. Cl.
   CPC ............ *H04L 9/0637* (2013.01); *H04L 9/003* (2013.01); *H04L 9/065* (2013.01); *H04L 9/0631* (2013.01); *H04L 9/0662* (2013.01); *H04L 2209/043* (2013.01)

(58) Field of Classification Search
   CPC ......... H04L 9/0637; H04L 9/065; H04L 9/00; H04L 9/003; H04L 9/0631; H04L 9/0662; H04L 2209/043; G06F 15/8053
   USPC .......................................................... 380/28
   See application file for complete search history.

(56) References Cited

U.S. PATENT DOCUMENTS

| | | | |
|---|---|---|---|
| 8,229,111 B2 * | 7/2012 | Nam ........................ | G11C 8/16 380/42 |
| 2003/0091185 A1 * | 5/2003 | Swindlehurst .......... | H04L 9/065 380/44 |
| 2006/0039553 A1 * | 2/2006 | Suen ....................... | H04L 9/065 380/28 |
| 2006/0039556 A1 * | 2/2006 | Suen ...................... | H04W 12/03 380/44 |
| 2006/0177050 A1 * | 8/2006 | Surendran ........... | H04L 63/0428 380/28 |
| 2007/0297268 A1 * | 12/2007 | Freebern .................. | G11C 8/18 365/230.06 |
| 2008/0260145 A1 * | 10/2008 | Trichina .................. | H04L 9/003 380/46 |

(Continued)

OTHER PUBLICATIONS

Kahn, et al., "AES and SNOW 3G are Feasible Choices for a 5G Phone from Energy Perspective", Mar. 28, 2017, 11 pages, The 1st EAI International Conference on 5G for Future Wireless Networks, 5GWN 2017.

(Continued)

*Primary Examiner* — Abu S Sholeman
(74) *Attorney, Agent, or Firm* — Trop, Pruner & Hu, P.C.

(57) ABSTRACT

An integrated circuit features technology for generating a keystream. The integrated circuit comprises a cipher block with a linear feedback shift register (LFSR) and a finite state machine (FSM). The LFSR and the FSM are configured to generate a stream of keys, based on an initialization value and an initialization key. The FSM comprises an Sbox that is configured to use a multiplicative mask to mask data that is processed by the Sbox when the LFSR and the FSM are generating the stream of keys. Other embodiments are described and claimed.

20 Claims, 8 Drawing Sheets

(56) References Cited

U.S. PATENT DOCUMENTS

| | | | | |
|---|---|---|---|---|
| 2012/0216020 | A1* | 8/2012 | Olson | G06F 9/30014 |
| | | | | 712/205 |
| 2014/0189289 | A1* | 7/2014 | Wolrich | H04L 63/045 |
| | | | | 712/7 |
| 2015/0270949 | A1* | 9/2015 | Michiels | G09C 1/00 |
| | | | | 380/28 |
| 2016/0078250 | A1* | 3/2016 | Michiels | G06F 21/53 |
| | | | | 713/189 |
| 2017/0033921 | A1* | 2/2017 | Michiels | G06F 21/14 |
| 2017/0366339 | A1* | 12/2017 | Noura | H04L 9/0869 |
| 2018/0091155 | A1* | 3/2018 | Kuenemund | H03K 19/094 |

OTHER PUBLICATIONS

"SNOW", last edited on Oct. 13, 2017, 2 pages, Wikipedia, https://en.wikipedia.org/wiki/SNOW.

"LTE Quick Reference: SNOW3G", accessed Dec. 10, 2018, 3 pages, Share Technote, http://www.sharetechnote.com/html/Handbook_LTE_SNOW3G.html.

"SNOW 3G Encryption Core", accessed on Dec. 10, 2018, 2 pages, IP Cores, Inc., http://www.ipcores.com/Snow3G.htm.

Kitsos, et al., "A High Performance ASIC Implementation of the SNOW 3G Stream Cipher", May 21, 2014, 5 pages.

"Specification of the 3GPP Confidentiality and Integrity Algorithms UEA2 & UIA2. Document 2: SNOW 3G Specification"; Sep. 6, 2006, 37 pages, SNOW 3G Algorithm Specification Version 1.1.

Benvenuto, "Galois Field in Cryptography", May 31, 2012, 11 pages.

Pramstaller, et al., "A Masked AES ASIC Implementation", 2004, 5 pages.

Watanabe, et al., "A Distinguishing Attack of SNOW 2.0 with Linear Masking Method"; 2004, pp. 222-233, SAC 2003, LNCS 3006, Springer-Verlag Berlin Heidelberg 2004.

* cited by examiner

TECHNOLOGY FOR GENERATING A KEYSTREAM WHILE COMBATTING SIDE-CHANNEL ATTACKS

TECHNICAL FIELD

The present disclosure pertains in general to data processing systems and in particular to computer security.

BACKGROUND

When data processing systems communicate with each other, those communications are often encrypted. Encryption may even be used to protect communications between different components within a single data processing system. One common way to encrypt a message that will be sent from one endpoint to another is with a block cipher. To use a block cipher, the source endpoint separates or partitions the plaintext message into a sequence of blocks of a predetermined size. Each block is a sequence of bits. Also, the source endpoint encrypts each block with a symmetric key and sends each encrypted block to the destination endpoint. When the destination endpoint receives an encrypted block, the destination endpoint uses the symmetric key for that block to decrypt that block. The destination endpoint uses the decrypted blocks to rebuild the original message. To enhance security, the endpoints may use a different symmetric key for each block. For purposes of this disclosure, the keys that the endpoints use to encrypt and decrypt message blocks may be referred to as "secret keys."

One popular technique for implementing a block cipher is described in version 1.1 of the "SNOW 3G Algorithm Specification," dated Sep. 6, 2006 (the "SNOW Specification"). The SNOW Specification describes a process or algorithm for computing a new secret key "z" for each block of a message. For purposes of this disclosure, that process may be referred to as the "SNOW process," and the secret keys that are generated by that process may be referred to as "SNOW keys." The SNOW keys generated by a device are based ultimately on a 128-bit initialization key (IK) and a 128-bit initialization variable or initialization value (IV) supplied by that device. If both endpoints for a message follow the SNOW Specification and use the same IK and IV, both endpoints will generate the same sequence of secret keys.

The SNOW process is one of the most popular cryptographic algorithms for protection of wireless data that is sent according via the Long-Term Evolution (LTE) standard, for instance. The SNOW process may also be used in $5^{th}$ Generation (5G) mobile networks.

However, the SNOW process may be vulnerable to side-channel attacks based on power analysis. In such a side channel attack, the attacker monitors the power consumption of the cryptographic hardware and attempts to crack the cryptography based on analysis of that power consumption.

The present disclosure involves technology for generating a keystream while combatting side-channel attacks.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

The SNOW process involves a finite state machine (FSM) that includes two so-called "S-Boxes": S-Box $S_1$ and S-Box $S_2$. Those S-Boxes may be vulnerable to side-channel attacks based on power analysis. One way to combat such attacks is to apply an additive mask to content before processing that content with one or both S-Boxes. However, those S-Boxes perform repeated multiplication and/or squaring operations. Consequently, those S-Boxes are not well suited for processing content that has been additively masked, because each squaring or multiplication operation introduces additional terms that require complicated calculations to cancel out the additive mask from the S-Box output (i.e., to "unmask" the output).

This disclosure describes one or more example embodiments of a data processing system with technology for generating a keystream using an approach that is similar in some respects to the SNOW process, but that provides protection against side-channel attacks. That technology may be implemented in a cipher block that generates a keystream, and the keys from that keystream may be used as secret keys in a block cipher, for instance.

As described in greater detail below, in one embodiment, a cipher block includes an FSM that includes at least one so-called "Sbox" that is significantly different from any of the S-Boxes described in the SNOW Specification. In addition, this cipher block includes features for additively masking content within the cipher block, for then converting the additive mask into a multiplicative mask before processing the content with the Sbox, and for then converting the multiplicative mask in the Sbox output into an additive mask. The cipher block thereby significantly simplifies subsequent mask reversal operations for removing the additive mask.

Moreover, all mask substitution operations may be computed in a manner that prevents the original unmasked data from ever being exposed at any stage in the FSM. The cipher block also includes a Multiplicative Mask Generator which uses a random number generator, a linear-feedback shift register (LFSR), and other features to automatically avoid generating multiplicative masks that are all zeroes.

Figure 1:
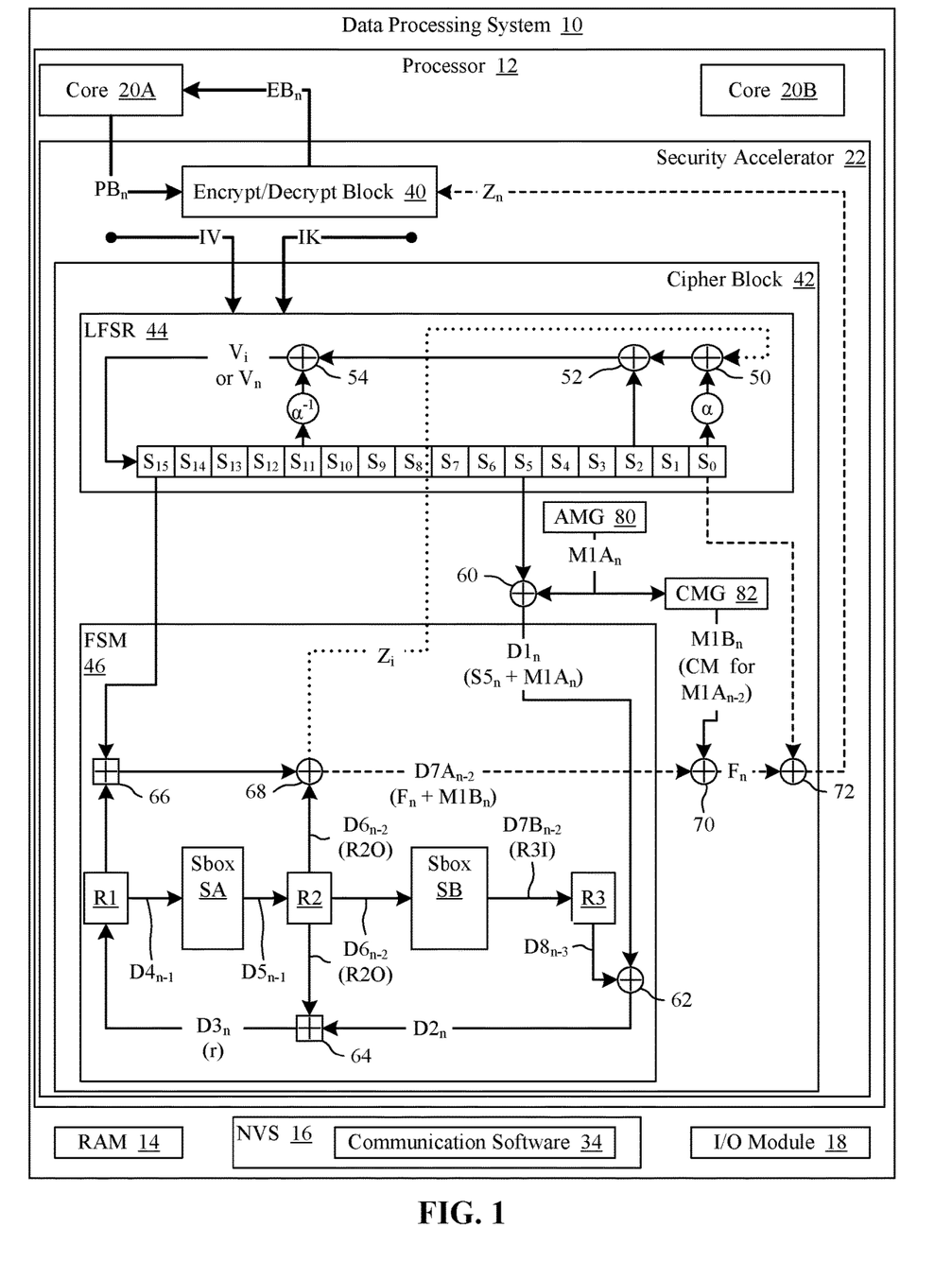
FIG. 1 is a block diagram depicting an example embodiment of a data processing system with technology for generating a keystream while combatting side-channel attacks based on power analysis.

FIG. 1 is a block diagram depicting an example embodiment of a data processing system 10 with technology for generating a keystream while combatting side-channel attacks based on power analysis. For purposes of illustration, data processing system 10 is depicted with a processor 12 that includes cores 20A and 20B and a security accelerator 22. Data processing system 10 also include random access memory (RAM) 14, non-volatile storage (NVS) 16, and an input/output (I/O) module 18 responsive to processor 12. NVS 16 includes various software components, such as an operating system (OS) and communication software 34. Processor 12 may copy communication software 34 from NVS 16 to RAM 14 for execution. Data processing system 10 may use communication software 34 to communicate with other data processing systems via I/O module 18. For instance, if data processing system 10 implements a smartphone, data processing system 10 may communicate with base stations via I/O module 18. Similarly, if data processing system 10 implements a base station, data processing system 10 may communicate with smartphones via I/O module 18.

Security accelerator 22 includes control logic for encrypting and decrypting messages sent and received by data processing system 10 according to a particular block cipher protocol. In the embodiment of FIG. 1, that control logic includes an encrypt/decrypt block 40 and a cipher block 42. As illustrated, in one embodiment or scenario, when a core in processor 12 (e.g., core 20A) is preparing to send a message to a remote data processing system, core 20A partitions or separates the plaintext version of the message into a stream of blocks of a predetermined size, such as 32 bits, and core 20A sends each of those blocks to security accelerator 22 for encryption. For each plaintext block "$PB_n$," security accelerator 22 uses encrypt/decrypt block 40 to generate an encrypted version "$EB_n$" of that block, based on a corresponding key "$Z_n$." Core 20A may send a stream of such encrypted blocks to the remote data processing system via I/O module 18.

In the embodiment of FIG. 1, data passes through different stages within cipher block 42, and the data takes on different phases as it passes through those stages, ultimately resulting in the generation of a new key $Z_n$ each cycle. In particular, cipher block 42 uses an LFSR 44, a finite state machine (FSM) 46, and various other elements to generate each key $Z_n$.

In the embodiment of FIG. 1, LFSR 44 and FSM 46 cooperate to generate a stream cipher in accordance, in certain respects, with the SNOW Specification. In particular, in the embodiment of FIG. 1, LFSR 44 includes 16 stages, labeled $S_0$ through $S_{15}$, and LFSR 44 operates according to the SNOW Specification. However, FSM 46 and other parts of cipher block 42 include enhancements to combat side-channel attacks based on power analysis. For instance, as described in greater detail below, cipher block 42 includes features for additively masking the data that enters FSM 46, and FSM 46 includes features for multiplicatively masking data before processing that data with an Sbox.

As illustrated, the elements in cipher block 42 include various exclusive-OR (XOR) elements 50, 52, 54, 60, 62, 68, 70, and 72 and integer addition elements 64 and 66. For purposes of this disclosure, the symbol for an XOR element is a circle surrounding a plus sign. XOR elements represent circuitry or other control logic for performing XOR operations. The XOR operation may also be expressed as bit addition without carry or addition modulo 2 (or "mod" 2) for each bit.

The symbol for an integer addition element is a square surrounding a plus sign. The integer addition element represents circuitry or other control logic for performing integer addition operations. For operands of size n, integer addition elements perform integer addition on those operands, mod $2^n$. For instance, integer addition with 32-bit operands is integer addition, mod $2^{32}$.

As described in greater detail below, this disclosure also involves elements which perform an operation referred to as "multiplication." The symbol for the multiplication element is a circle surrounding a multiplication sign or an x. For purposes of this disclosure, unless expressly stated otherwise, multiplication means multiplication in a finite field, and in particular, multiplication in a Galois Field (GF), which is a finite field of characteristic 2, which may also be referred to as "GF($2^n$)". Accordingly, multiplication produces the result that would be produced by repeated additions without carry (which is equivalent to repeated XOR operations), and with the final product reduced using the relevant reduction polynomial from the SNOW specification. For instance, Sbox SB (described in greater detail below) uses the following reduction polynomial to reduce all intermediate results to 8-bit values: $x^8+x^6+x^5+x^3+1$. For purposes of this disclosure, that polynomial may be referred to as the "S2 reduction polynomial." In addition, as described in greater detail below Sbox SB may use the following working polynomial to generate those intermediate results: $x+x^9+x^{13}+x^{15}+x^{33}+x^{41}+x^{47}+x^{49}$. And Sbox SB may reduce each of those exponents using the S2 reduction polynomial. Any suitable technique may be used to perform multiplication, such as repeated addition, integer multiplication but with carries suppressed when adding the partial products, etc.

Regarding the data flow illustrated in FIG. 1, some portions of that flow differ depending on the operating mode of cipher block 42. Accordingly, for the portions which differ, FIG. 1 uses a dotted line to depict the data flow in initialization mode, and dashed lines to depict the data flow in key-generation or keystream mode. Also, FIG. 1 uses the subscript "i" to denote values generated in initialization mode, and the subscript "n" to denote values generated in keystream mode. For instance, when cipher block 42 is operating in initialization mode, XOR element 50 receives a $Z_i$ value from FSM 46, and XOR element 54 sends a $V_i$ value to stage $S_{15}$. And when cipher block 42 is in keystream mode, XOR element 54 sends a $V_n$ value to stage $S_{15}$. Also, when cipher block 42 is in initialization mode, the "$Z_i$" output from XOR element 68 in FSM 46 is sent as input to XOR element 50 in LFSR 44. By contrast, when cipher block 42 is operating in keystream mode, the $Z_n$ output from XOR element 72 is sent as input to encrypt/decrypt block 40. And XOR element 72 generates $Z_n$ based on the output from XOR element 70 and the output from stage $S_0$ of LFSR 44. Also, at the start of initialization mode, the stages of LFSR 44 are populated according to the SNOW Specification, based on an IV and an IK.

Accordingly, for purposes of this disclosure, $Z_n$ corresponds to $z_t$ from the SNOW Specification, $V_i$ and $V_n$ correspond to v, and $F_n$ corresponds to F.

In the embodiment of FIG. 1, FSM 46 includes registers R1, R2, and R3, each of which holds 32 bits, as well as Sboxes SA and SB. Sbox SA corresponds to "S-Box $S_1$" from the SNOW specification, and Sbox SB corresponds to "S-Box $S_2$" from the SNOW specification. Accordingly, on each clock cycle, Sbox SB maps the 32-bit input from R2 to a 32-bit output for R3, and Sbox SA maps the 32-bit input from R1 to a 32-bit output for R2.

However, unlike S-Box $S_2$ from the SNOW specification, Sbox SB includes additional features pertaining to multiplicative masking, as described in greater detail below. In other embodiments, Sbox SA may also include similar features to perform multiplicative masking. Additionally, in the embodiment of FIG. 1, cipher block 42 includes features for using an additive mask "$M1A_n$" to mask the data that FSM 46 receives from LFSR 44 in keystream mode, as well as features for unmasking the $F_n$ value that is used to generate $Z_n$. For instance, cipher block 42 includes an additive mask generator (AMG) 80 that generates a new random 32-bit mask $M1A_n$ every cycle or tick of the clock, and an XOR element 60 that adds $M1A_n$ to the value from stage $S_5$ of LFSR 44 during that same cycle. The value obtained from stage $S_5$ during cycle "n" may be referred to as "$S5_n$".

As indicated above, data takes on different phases as it passes through different stages within cipher block 42. Accordingly, in FIG. 1, the output from XOR element 60 is labeled "$D1_n$", with "D" signifying data that is processed by FSM 46, "1" signifying the phase of that data, and the subscript "n" signifying the particular cycle during which the first phase of that data was received by FSM 46. Thus, after the data referred to as $D1_n$ passes through XOR element 62, that data is depicted as $D2_n$, for example. And as another example, the data that enters R2 during that same cycle "n" is a phase of the data that was received by FSM 46 during the previous cycle. Accordingly, the data that enters R2 is depicted as $D5_{n-1}$. Similarly, during cycle "n," Sbox SB receives $D6_{n-2}$ and generates $D7B_{n-2}$, which is received by R3.

In addition, XOR element 68 also receives $D6_{n-2}$. And in response, XOR element 68 generates $D7A_{n-2}$. As indicated in FIG. 1, $D7A_{n-2}$ may also be referred to as "$F_n+M1B_n$", to indicate that the data can be used to generate $F_n$, if the additive mask $M1B_n$ can be removed from the data. For purposes of this disclosure, a mask that can be used to remove another mask from data may be referred to as a "compensatory mask."

Significantly, cipher block 42 includes a compensatory mask generator (CMG) 82 that generates compensatory masks based on additive masks. CMG 82 may use any suitable approach to generate compensatory masks based on additive masks. For instance, CMG 82 may perform the same kinds of operations on an additive mask (e.g., $M1A_{n-2}$) as FSM 46 performs on the data to which that additive mask has been added (e.g., $D1_{n-2}$, etc.). In other words, CMG 82 generates a compensatory mask by changing an additive mask "M1A" in the same manner as FSM 46 changes the corresponding D1 as D1 progresses through the FSM stages to become D2, D3, etc. Accordingly, CMG 82 is configured to receive an additive mask M1A every cycle, and output the compensatory mask for that additive mask two cycles later. Thus, during cycle "n," CMG 82 receives additive mask $M1A_n$, and CMG 82 produces the compensatory mask for $M1A_{n-2}$, as shown in FIG. 1. Consequently, as indicated in FIG. 1, $M1B_n$ is the compensatory mask (CM) for $M1A_{n-2}$.

And when XOR element 70 combines $D7A_{n-2}$ and $M1B_n$, the result is $F_n$.

FSM 46 also includes features for using a multiplicative mask to mask the data within FSM 46 that receives S-box processing. As described in greater detail below, those features include Byte Processing Units which (a) apply multiplicative masks before performing certain Sbox operations and (b) remove those multiplicative masks before outputting data to other components, such as R3. In the embodiment of FIG. 1, some or all of those features reside in Sbox SB, and Sbox SA operates more or less like S-Box $S_1$ from the SNOW Specification. However, as indicated above, in other embodiments, Sbox SA may also use multiplicative masking.

Figure 2:
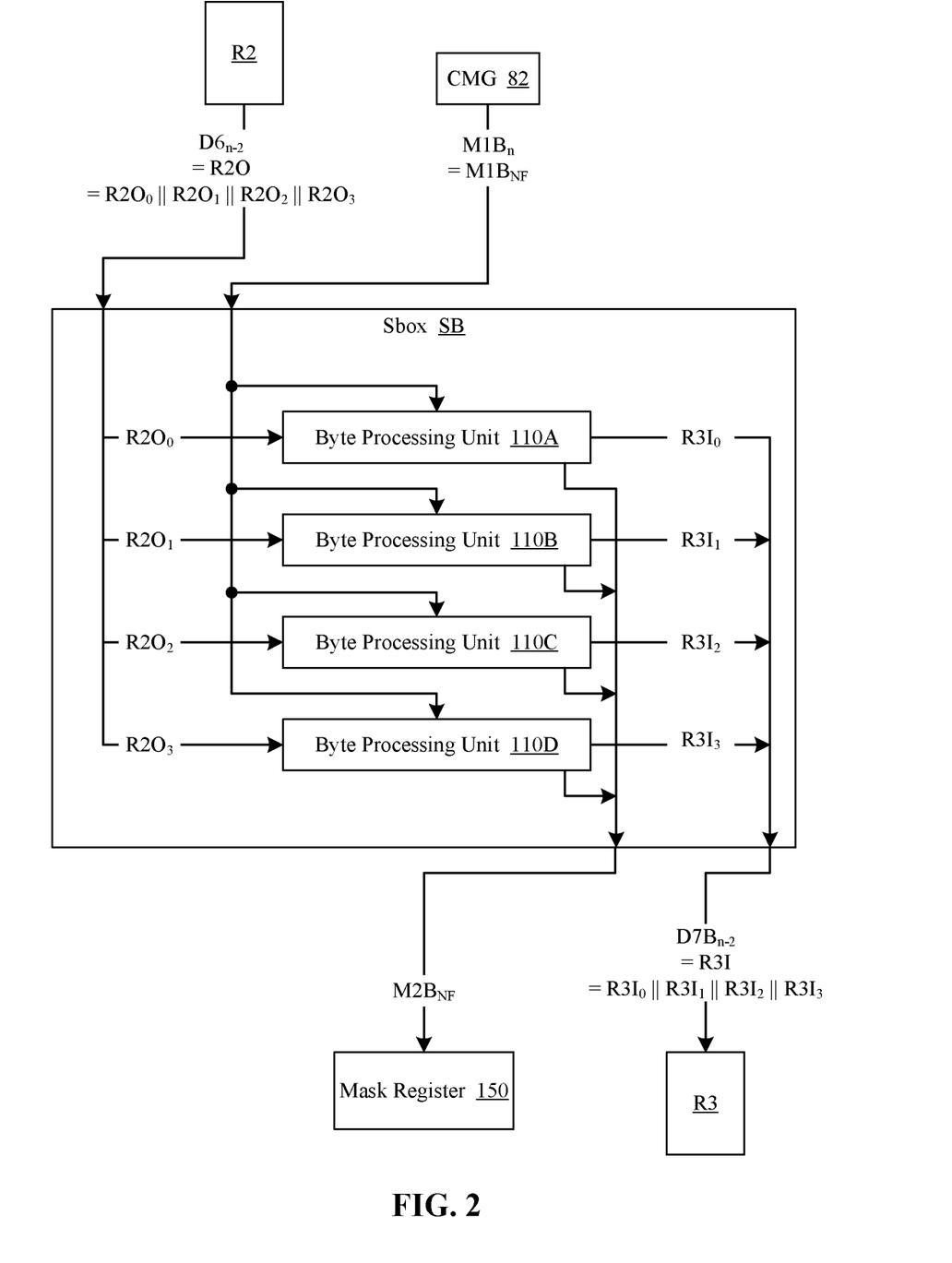
FIG. 2 is a block diagram depicting one of the Sboxes from FIG. 1 in greater detail.

FIG. 2 is a block diagram depicting Sbox SB in greater detail. As illustrated, Sbox SB receives $D6_{n-2}$ from register R2, and based on that data, Sbox SB generates $D7B_{n-2}$ for register R3. As illustrated, $D6_{n-2}$ may also be referred to as "R2O," since it is the output from R2, and $D7B_{n-2}$ may also be referred to as "R3I," since it is the input for R3. Furthermore, R2O may also be referred to as "$R2O_0\|R2O_1\|R2O_2\|R2O_3$", to denote the 4 consecutive bytes which make up the 32-bit R2O value (with the subscript "0" denoting the most significant byte and the subscript "3" denoting the least significant byte). Similarly, R3I may also be referred to as "$R3I_0\|R3I_1\|R3I_2\|R3I_3$", to denote the 4 bytes which make up the 32-bit R3I value (with the subscript "0" denoting the most significant byte and the subscript "3" denoting the least significant byte).

As illustrated, Sbox SB includes four Byte Processing Units 110A through 110D. In one embodiment, Byte Processing Units 110A through 110D are all the same or similar. As illustrated, each of those units receives a different byte from R2O as input content and generates a respective byte of output content for storage in R3I. Each Byte Processing Unit also receives the compensatory mask $M1B_n$ for the input content from CMG 82. For purposes of FIGS. 2-4, "$M1B_n$" may be referred to simply as "M1B." And since M1B also belongs to the native field, M1B may also be referred to as "$M1B_{NF}$."

As described in greater detail below, each Byte Processing Unit, in effect, transforms the additive mask for the input content into a multiplicative mask, for more efficient computation within an Sbox. Also, the Sbox applies the multiplicative mask in an isomorphic field of $GF(2^4)^2$, and the Sbox uses 4-bit multiplication operations instead of 8-bit operations to further simplify overall masking.

Figure 3:
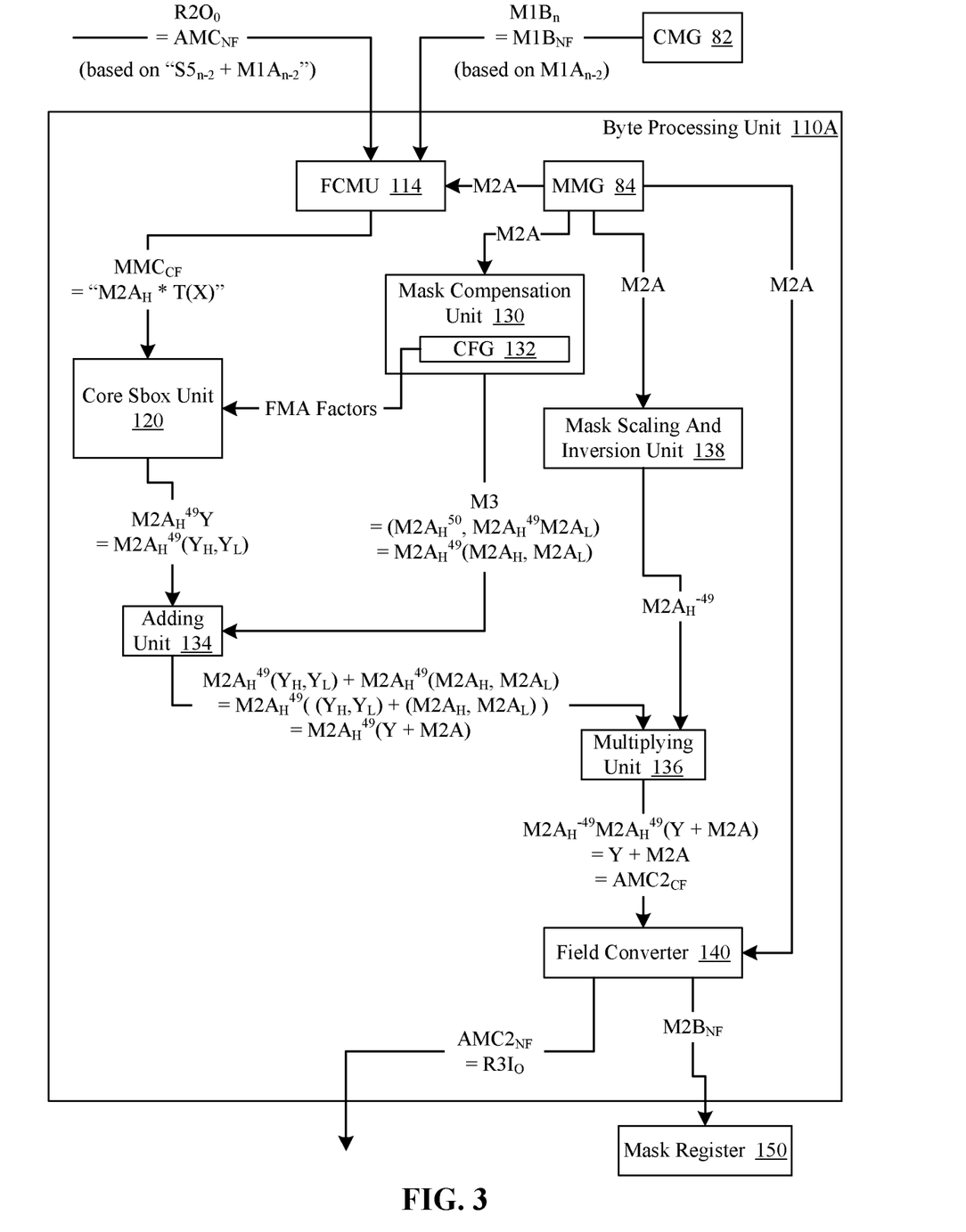
FIG. 3 is a block diagram depicting one of the Byte Processing Units from FIG. 2 in greater detail.

FIG. 3 is a block diagram depicting one of the Byte Processing Units from FIG. 2 in greater detail. For purposes of illustration, FIG. 3 focuses on Byte Processing Unit 110A. Each of the other Byte Processing Units may include the same kinds of features and may perform the same kinds of operations on their respective inputs.

As shown in FIG. 3, one of the inputs to Byte Processing Unit 110A is $R2O_0$. And, as indicated above, $R2O_0$ is based on data that has been additively masked. Accordingly, $R2O_0$ may also be referred to as "additively masked content" (AMC) for short. Also, $R2O_0$ belongs to the finite field $GF(2^8)$. For purposes of this disclosure, the field $GF(2^8)$ may be referred to as the "native field." As described in greater detail below, Byte Processing Unit 110A performs conversion from the native field $GF(2^8)$ to an isomorphic field $GF(2^4)^2$. For purposes of this disclosure, the isomorphic field $GF(2^4)^2$ may be referred to as the "composite field." Since AMC is shorthand for $R2O_0$, and $R2O_0$ belongs to the native field, AMC may be referred to more specifically as "$AMC_{NF}$."

As described in greater detail below, Byte Processing Unit 110A also performs numerous additional operations, including conversion from the composite field to the native field. As shown in FIG. 3, those operations include producing multiplicatively masked content (MMC), converting MMC in the composite field to AMC in the composite field, and outputting in the native field. As shown in FIG. 3, that output may be referred to as "$AMC2_{NF}$". That output may also be referred to as "$R3I_0$", since that output serves as one of the bytes to be stored in R3 as R3I, as shown in FIG. 2. Thus, referring also to FIG. 1, Byte Processing Unit 110A converts one of the bytes of the additively masked value $D6_{n-2}$, (which is based on S5 and M1A) to a corresponding byte in the multiplicatively masked value $D7B_{n-2}$ (which is based on S5 and M2A, where "M2A" represents a multiplicative mask). In other words, Byte Processing Unit 110A basically converts "X+M1" to "X*M2", where X represents the content that would exist if masking had not been applied, M1 represents an additive mask, and M2 represents a multiplicative mask. Moreover, Byte Processing Unit 110A accomplishes its results without exposing S5 (or "X") at any point to side channel attacks based on power analysis.

As shown in FIG. 3, another input to Byte Processing Unit 110A is M1B$_n$. Byte Processing Unit 110A may obtain M1B$_n$ from CMG 82. As indicated above, M1B$_n$ is the compensatory mask for M1A$_{n-2}$ (i.e., the additive mask that was used during the process of generating R2O). In one embodiment, as indicated above, CMG 82 includes features which cause M1A to become M1B by following the masked data (e.g., D1$_n$) through FSM 46 (or through the same kinds of stages implemented separately) and into Byte Processing Units 110A-110D. For instance, CM 82 may include registers similar to R1 and R2, and those registers may flop M1A like R1 and R2 flop their inputs. Consequently, M1B arrives at Byte Processing Units 110A-110D two cycles after the corresponding M1A enters FSM 46.

Also, Byte Processing Unit 110A includes a Multiplicative Mask Generator (MMG) 84. MMG 84 generates a new random multiplicative mask M2A each cycle.

Figure 8:
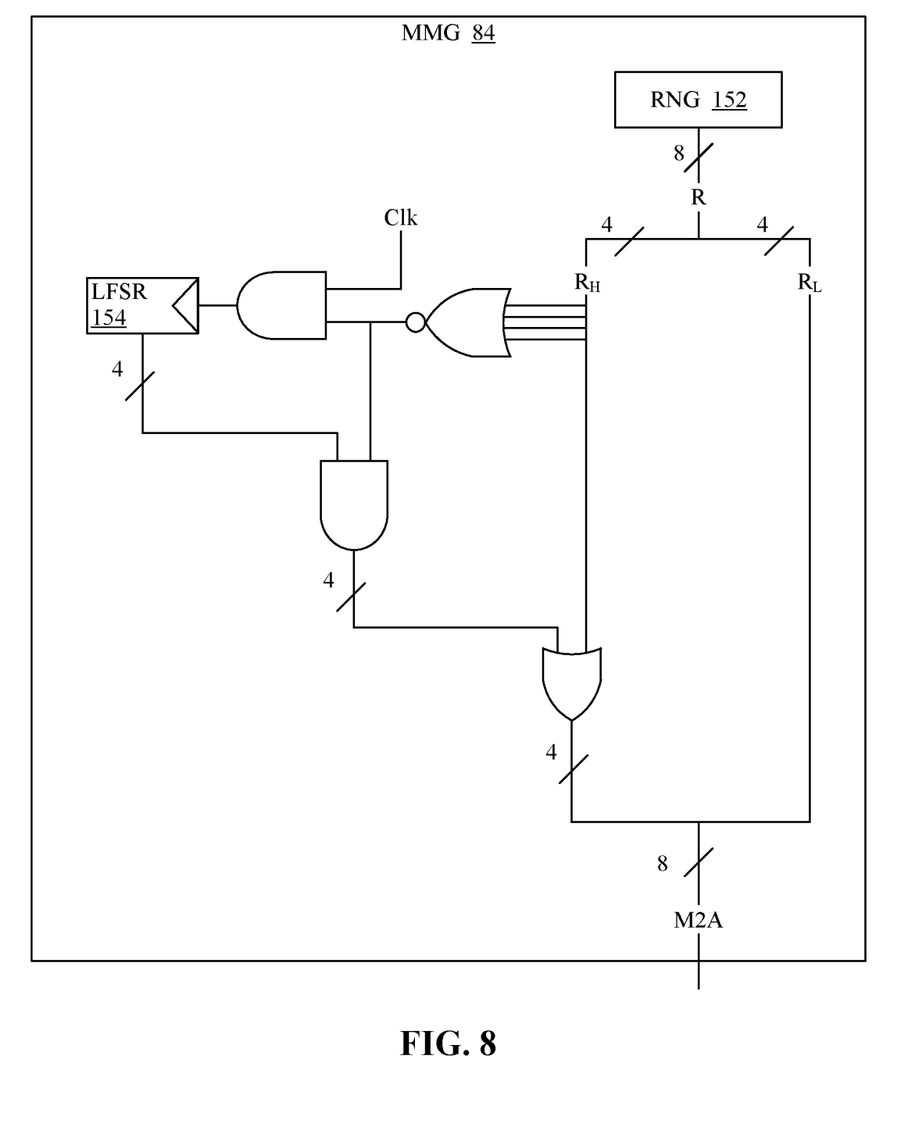
FIG. 8 is a block diagram depicting the Multiplicative Mask Generator from FIG. 3 in greater detail.

FIG. 8 is a block diagram depicting MMG 84 in greater detail. MMG 84 is configured to avoid generating a multiplicative mask that is all zeros, to ensure that Byte Processing Unit 110A uses only non-zero multiplicative masks.

In particular, in the embodiment of FIG. 8, MMG 84 includes a random number generator (RNG) 152 coupled to a 4-bit LFSR 154 via a NOR element and an AND element. RNG generates an 8-bit random number "R" every cycle. If all 4 bits of the high-order nibble "R$_H$" are zero, the NOR element sends a one. That one is ANDed with the clock signal "Clk" to activate LFSR 154. The one from the NOR element is also ANDed with the output from LFSR 154, and those results are ORed with R$_H$, thereby replacing the all-zero high-order nibble with a high-order nibble that is not all zeros. MMG 84 then reconnects or concatenates R$_H$ with the low-order nibble R$_L$, resulting in an 8-bit value that is suitable for use as a multiplicative mask. That value may be referred to as "M2A."

MMG 84 ensures that that high-order nibble is not all zeros because LFSR 154 is configured to cycle through output values from 1 to 15, always skipping zero. For purposes of this disclosure, the elements which convert an R$_H$ of all zeros to an R$_H$ that is not all zeros may be referred to as a "zero detector unit" or a "correction unit." As indicated above, LFSR 154 visits all 15 states except 0. Also, LFSR 154 increments only in the presence of a zero-valued RH, and appropriately overwrites the mask with a non-zero value. The use of (a) a full length LFSR (that traverses all states except 0) and (b) intermittent need-based activation guarantees presence of full entropy in the multiplicative mask.

Referring again to FIG. 3, Byte Processing Unit 110A also includes a Fused Conversion-and-Masking Unit (FCMU) 114. FCMU 114 uses an integrated approach to perform field conversion and masking. In particular, FCMU 114 performs operations such as GF($2^8$)-to-GF($2^4$)$^2$ field conversion and multiplicative mask application.

Part of that process involves FCMU 114 receiving R2O$_0$, M1B$_{NF}$, and M2A as input. Based on those inputs, FCMU 114 generates output referred to herein as "multiplicatively masked content" or "MMC," as described in greater detail below with regard to FIG. 4. Also, as indicated below, the MMC belongs to the composite field. Consequently, the MMC that FMCU 114 generates may be referred to as "MMC$_{CF}$."

More specifically, referring also to FIG. 1, during clock cycle "n," R2O$_0$ is based on the additively masked value D1 that XOR element 60 generated (from S5 and M1A) two cycles previously. In other words, during clock cycle "n," R2O$_0$ is a byte from the D6$_{n-2}$ phase of what started out as "S5+M1A". Also, as indicated above, M1B$_n$ is the compensatory mask for M1A$_{n-2}$. Thus, during clock cycle "n," R2O$_0$ is based on "S5$_{n-2}$+M1A$_{n-2}$" (i.e., the additively masked value generated by XOR element 60 during clock cycle "n-2"). Therefore, R2O$_0$ may be referred to as "additively masked input" to FCMU 114, and that input is based on "S5$_{n-2}$+M1A$_{n-2}$", in the native field GF($2^8$). FCMU 114 converts that additively masked input into a multiplicatively masked value in the composite field GF($2^4$)$^2$, as indicated above and as described in greater detail below with regard to FIG. 4.

Figure 4:
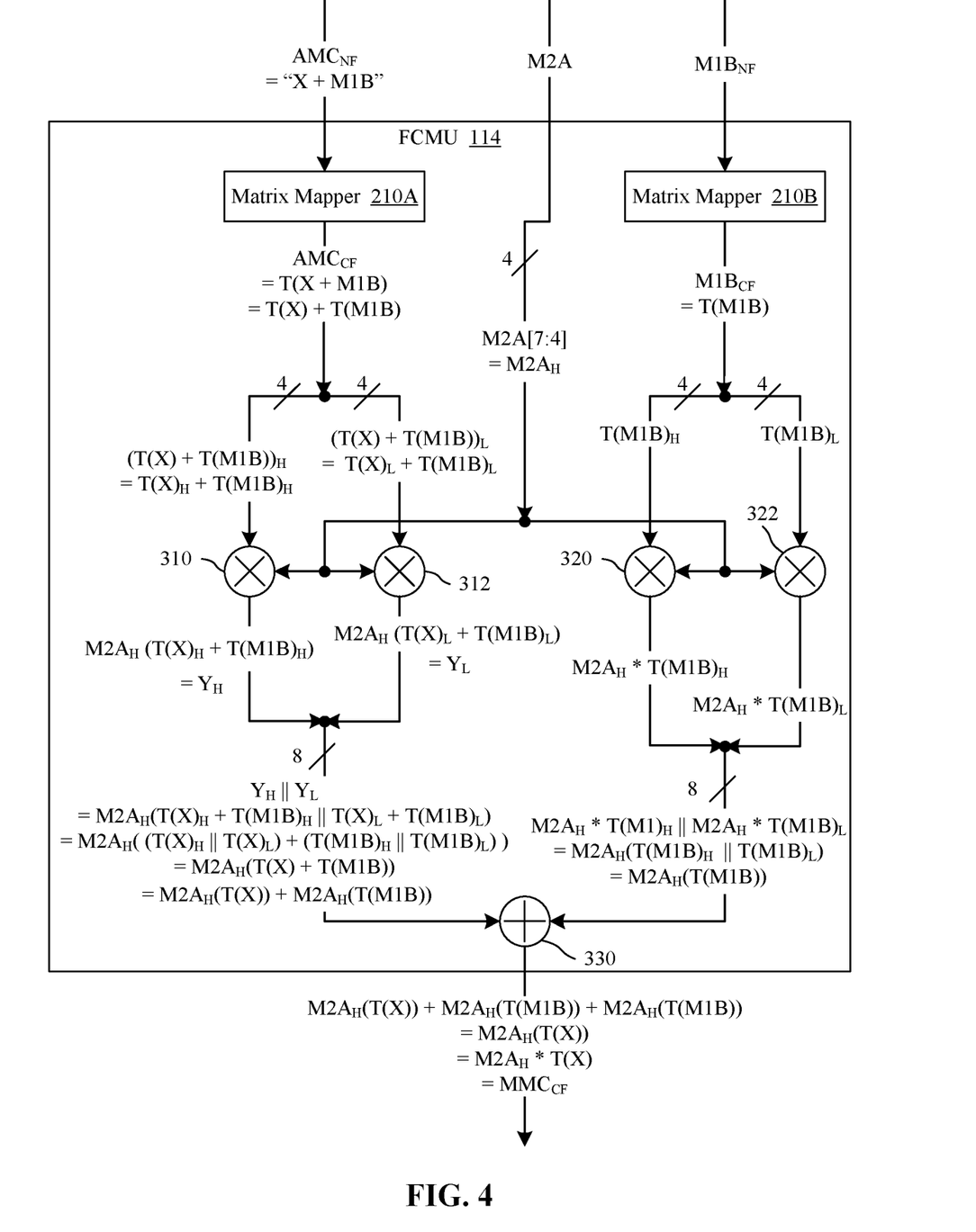
FIG. 4 is a block diagram depicting the Fused Conversion-and-Masking Unit from FIG. 3 in greater detail.

FIG. 4 is a block diagram depicting FCMU 114 in greater detail. As indicated above, AMC$_{NF}$ belongs to the native field of GF($2^8$), and FCMU 114 performs integrated GF($2^8$)-to-GF($2^4$)$^2$ conversion and masking. In particular, as described in greater detail below, FCMU 114 converts AMC$_{NF}$ from the native field to the composite field of GF($2^4$)$^2$, and FCMU 114 replaces the additive mask with a multiplicative mask. FCMU 114 also converts M1B$_{NF}$ from the native field to the composite field. For purposes of this disclosure, the converted AMC value may be referred to as "AMC$_{NF}$", and the converted M1B value may be referred to as "M1B$_{CF}$". Also, as described in greater detail below, replacing the additive mask with the multiplicative mask involves multiplying the high-order nibble of M2A (i.e., M2A$_H$) to the composite field phases of both AMC$_{NF}$ and M1B$_{NF}$. Subsequent addition of these results replaces the additive mask in input data by the multiplicative mask. As described in greater detail below with regard to FIG. 3, Byte Processing Unit 110A then processes the multiplicatively masked data using a Core Sbox Unit 120.

As illustrated in FIG. 4, one of the inputs to FCMU 114 is M2A. However, in one embodiment, FCMU 114 only uses the high-order nibble of M2A (i.e., M2A[7:4]), which may be referred to as "M2A$_H$". For purposes of this disclosure, a high-order nibble may also be referred to as a "leading nibble." The inputs to FCMU 114 also include AMC$_{NF}$ and M1B$_{NF}$. Also, since M2A$_H$ is a 4-bit nibble, M2A$_H$ belongs to GF($2^4$).

As illustrated, AMC$_{NF}$ may also be referred to as "X+M1B". In that expression, the letter "X" denotes the value that AMC$_{NF}$ would contain if S5$_{n-2}$ had not been additively masked. And since M1B is the compensatory mask for AMC$_{NF}$, it would be possible to derive X by adding M1B to AMC$_{NF}$, or by subtracting M1B from AMC$_{NF}$ (since bitwise addition without carry is the same as bitwise subtraction without carry). Consequently, the expression "X+M1B" represents the same value as AMC$_{NF}$. As described in greater detail below, FMCU 114 converts "X+M1B" into "X*M2A$_H$". Moreover, FMCU 114 performs that conversion without exposing X.

As shown in FIG. 4, FCMU 114 includes Matrix Mappers 210A and 210B, which may be implemented as 8×8 mapping matrices, each of which converts input operands from the native field to the composite field via field isomorphism. In particular, Matrix Mapper 210A transforms AMC$_{NF}$ into AMC$_{CF}$, and Matrix Mapper 210B transforms M1B$_{NF}$ to M1B$_{CF}$. As illustrated, M1B$_{CF}$ may be referred to as "T(M1B)", to denote the transformed version of M1B$_{CF}$, and AMC$_{CF}$ may be referred to as "T(X+M1B)", to denote the transformed version of content that has been additively masked. In addition, the transformation that Matrix Mapper 210A performs is transitive, in that "T(X+M1)" represents the same value as "T(X)+T(M1)".

FCMU 114 then splits that value into a high-order nibble and a low-order nibble, denoted respectively as "(T(X)+T(M1B))$_H$" and "(T(X)+T(M1B))$_L$". Those same values may also be denoted, respectively, as "T(X)$_H$+T(M1B)$_H$" and "T(X)$_L$+T(M1B)$_L$".

As shown at multiplication elements 310 and 312, FCMU 114 then multiplies both of the above values by M2A$_H$. Consequently, multiplication element 310 generates "M2A$_H$(T(X)$_H$+T(M1B)$_H$)", and multiplication element 312 generates "M2A$_H$(T(X)$_L$+T(M1B)$_L$)." That first value may also be expressed as "M2A$_H$*T(X)$_H$+M2A$_H$*T(M1B)$_H$" (or "Y$_H$"), and that second value may also be expressed as "M2A$_H$*T(X)$_L$+M2A$_H$*T(M1B)$_L$" (or "Y$_L$"). As illustrated, FCMU 114 then concatenates Y$_H$ and Y$_L$, resulting in "M2A$_H$(T(X)) M2A$_H$(T(M1B))".

Meanwhile, FCMU 114 also splits M1B$_{CF}$ into a high-order nibble and a low-order nibble, denoted respectively as "T(M1B)$_H$" and "T(M1B)$_L$". As shown at multiplication elements 320 and 322, FCMU 114 then multiplies both of the above values by M2A$_H$. Consequently, multiplication element 320 generates "M2A$_H$*T(M1B)$_H$", and multiplication element 322 generates "M2A$_H$*T(M1B)$_L$". As illustrated, FCMU 114 then concatenates those two nibbles, resulting in "M2A$_H$*T(M1B)" (or "M2A$_H$(T(M1B))").

FCMU 114 then uses XOR element 330 to add "M2A$_H$(T(X))+M2A$_H$(T(M1B))" and "M2A$_H$(T(M1B))". However, that expression adds the terms "M2A$_H$(T(M1B))" twice, which means those terms cancel out, leaving M2A$_H$(T(X)), which may also be expressed as "M2A$_H$*T(X)". FCMU 114 may then return that value to Byte Processing Unit 110A as MMC$_{CF}$.

Referring again to FIG. 3, when Byte Processing Unit 110A receives MC$_{CF}$ from FCMU 114, Byte Processing Unit 110A uses Core Sbox Unit 120 and a Mask Compensation Unit 130 to map the multiplicatively masked 8-bit input MMC$_{CF}$ into multiplicatively masked 8-bit output. As described in greater detail below, for purposes of this disclosure, that output may be referred to as "M2A$_H^{49}$Y".

In particular, as described in greater detail below, Core Sbox Unit 120 includes elements referred to herein as "fused multiplier-adders" (FMAs), and Mask Compensation Unit 130 includes a Compensation Factor Generator (CFG) 132 which supplies the FMAs with factors to be used during the Sbox computations.

Figure 5:
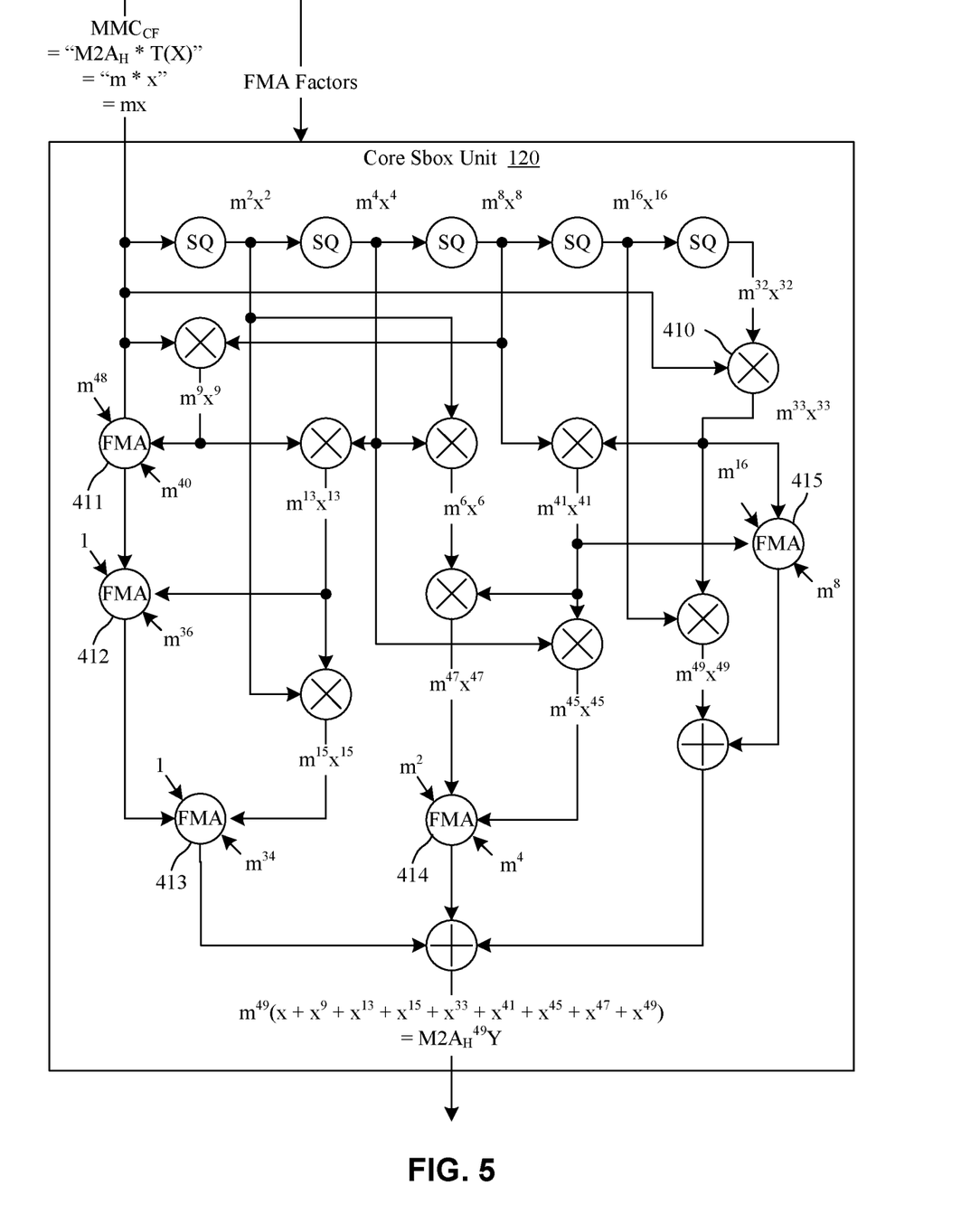
FIG. 5 is a block diagram depicting the Core Sbox Unit from FIG. 3 in greater detail.

FIG. 5 is a block diagram depicting Core Sbox Unit 120 in greater detail. As indicated above, Core Sbox Unit 120 receives MMC$_{CF}$ as input from FCMU 114 and the FMA factors as input from CFG 132. As indicated above, MMC$_{CF}$ may also be denoted as "M2A$_H$*T(X)". Also, for purposes of FIG. 5, M2A$_H$ may be called "m" for short, and T(X) may be called "x" for short. Accordingly, "M2A$_H$*T(X)" may also be denoted as "m*x" or "mx". As described in greater detail below, Core Sbox Unit 120 includes features for generating M2A$_H^{49}$Y, based at least in part on MMC$_{CF}$. For purposes of this disclosure, those features may be referred to collectively as "core Sbox logic."

In particular, as illustrated, Core Sbox Unit 120 uses a sequence of squaring elements (represented as a circle surrounding the term "SQ") to generate many different values (e.g., m$^2$x$^2$, m$^4$x$^4$, etc.), based on mx. Core Sbox Unit 120 also uses various multiplication elements to generate additional values. In some respects, Core Sbox Unit 120 may be similar to a conventional SNOW S-Box S$_2$.

According to the SNOW Specification, the S-Box S2 uses the S-Box S$_Q$, and the S-Box S$_Q$ is constructed using the Dickson polynomial g49(x)=x+x$^9$+x$^{13}$+x$^{15}$+x$^{33}$+x$^{41}$+x$^{45}$+x$^{47}$+x$^{49}$, where "+" denotes the bitwise XOR operation.

Similarly, Core Sbox Unit 120 may use a working polynomial with nine terms, such as the Dickson polynomial, but with certain changes to enable the computations to be masked. One of those changes is Core Sbox Unit 120 features FMAs in the places where the conventional S-Box would include addition elements. As described in greater detail below, the FMAs are used to generate mask scaling factors that allow later stages to easily remove the multiplicative mask. In particular, as illustrated, Core Sbox Unit 120 includes five FMAs 411-415.

Figure 6:
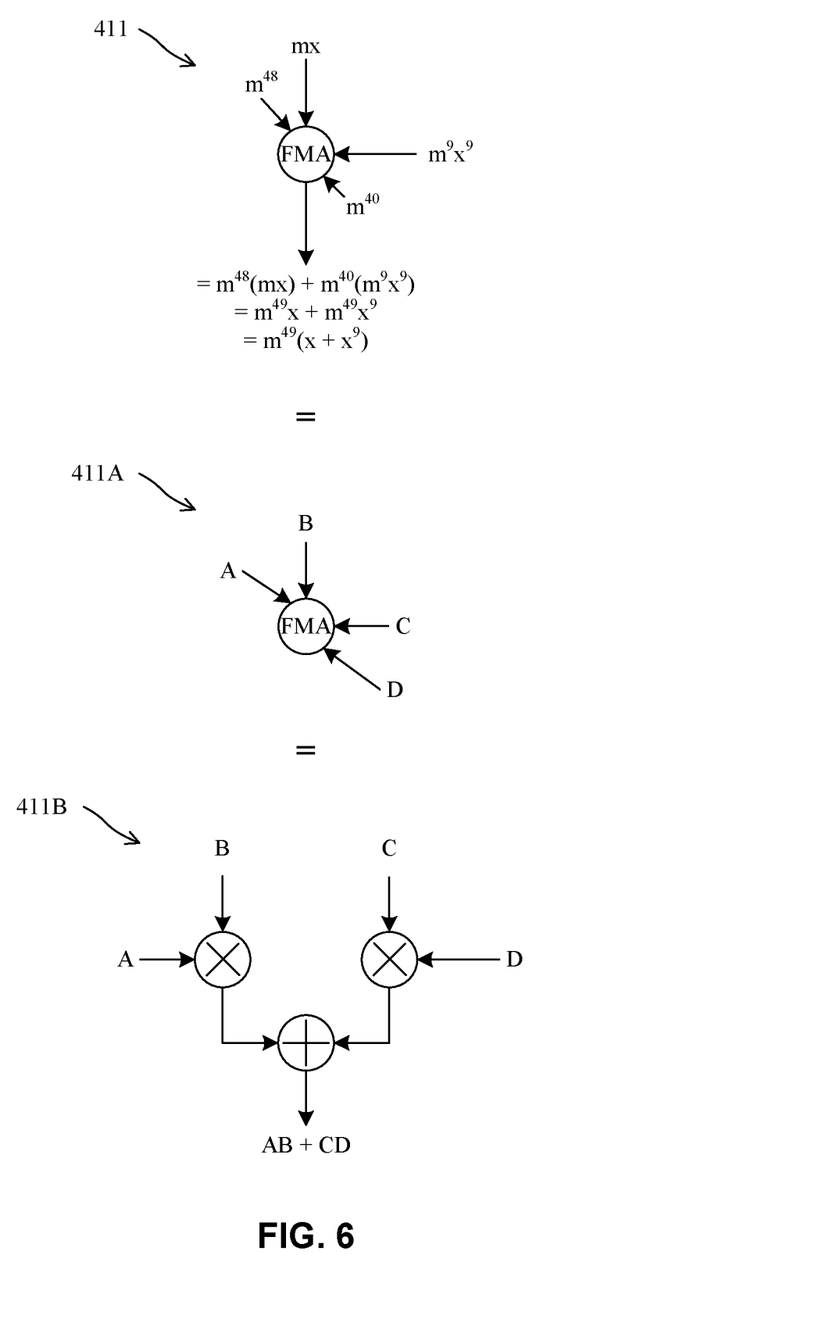
FIG. 6 is a block diagram depicting a Fused Multiplier-Adder from FIG. 5 in greater detail.

FIG. 6 is a block diagram depicting FMA 411 from FIG. 5 in greater detail. Each of the other FMAs may be the same or similar. FIG. 6 also depicts a generalized version 411A for FMA 411, and a more detailed illustration 411B of generalized version 411A.

As illustrated, FMA 411 receives two pairs of input values or factors. In versions 411A and 411B, those factors are denoted A, B, C, and D, with A and B constituting one pair, and C and D constituting the other pair. As shown in version 411B, FMA 411 multiplies each pair and then adds those two intermediate results to generate a final result. Accordingly, as illustrated, the final result may be denoted as "AB+CD". For instance, as illustrated, FMA 411 receives m$^{48}$ and mx as one pair of factors, and m$^{40}$ and m$^9$x$^9$ as the other pair. Consequently, FMA 411 multiplies the factors in each pair and then adds those intermediate results to generate the final result of "m$^{48}$(mx) m$^{40}$(m$^9$x$^9$)", which may also be expressed as "m$^{49}$x+m$^{49}$x$^9$" or "m$^{49}$(x+x$^9$)".

In addition, one or more of the factors that are used by each FMA come from CFG 132. In particular, CFG 132 and Core Sbox Unit 120 are configured so that CFG 132 supplies Core Sbox Unit 120 with the factor values illustrated in FIG. 5.

Figure 7:
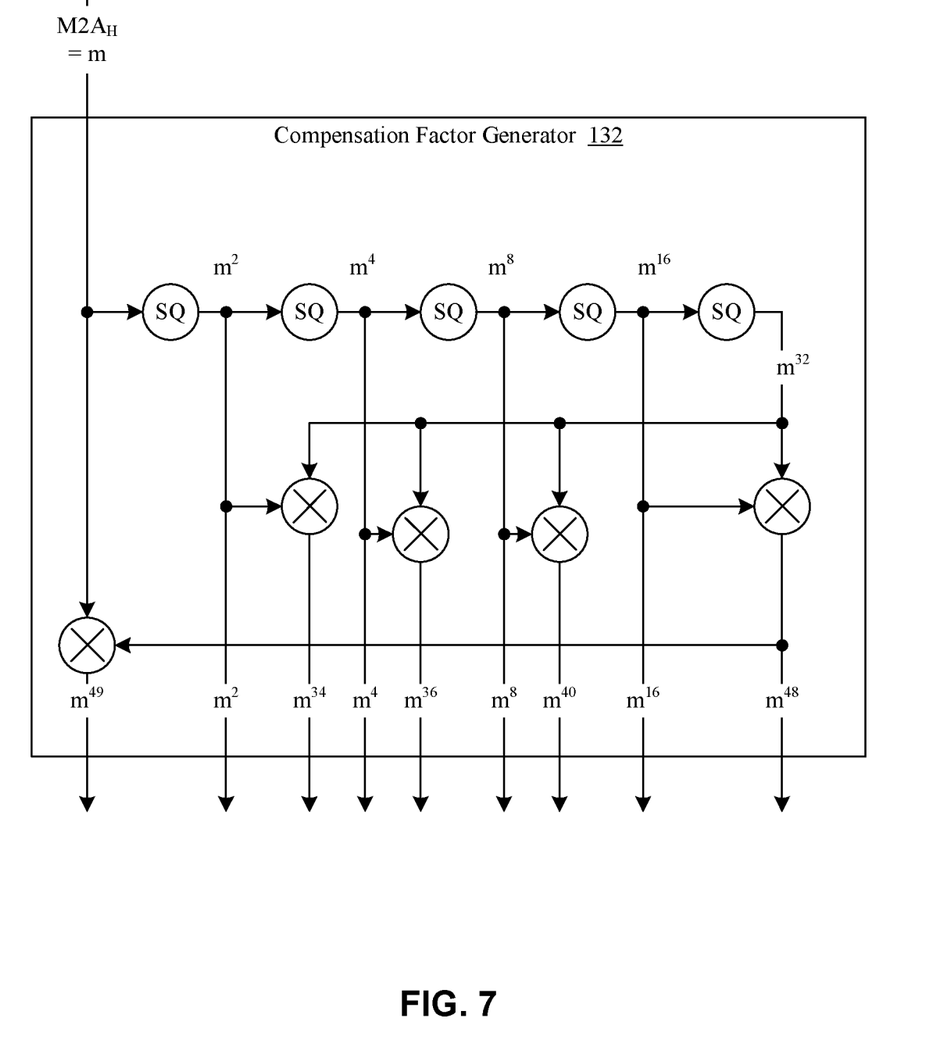
FIG. 7 is a block diagram depicting a Compensation Factor Generator from FIG. 3 in greater detail.

FIG. 7 is a block diagram depicting CFG 132 from FIG. 3 in greater detail. As illustrated, CFG 132 uses various squaring and multiplication elements to generate certain FMA factors, based on a given multiplicative mask value M2A$_H$. Those FMA factors may also be referred to as "compensation factors" because they enable Mask Compensation Unit 130 to compensate for the multiplicative mask M2A$_H$ that cipher block 42 uses to protect computations in Core Sbox Unit 120 from side-channel attacks. In particular, as illustrated, Mask Compensation Unit 130 generates the following FMA/compensation factors: m$^2$, m$^4$, m$^8$, m$^{16}$, m$^{34}$, m$^{36}$, m$^{40}$, m$^{48}$, and m$^{49}$. Also, CFG 132 generates these FMA inputs in parallel with the Sbox computations without impacting critical path delay, thus limiting impact of masking on encryption performance.

Referring again to FIG. 5, Core Sbox Unit 120 also includes one addition element to generate the ultimate output from Core Sbox Unit 120. Moreover, FMA elements 411-415 use compensation factors that balance out the masking factors across all 9 Sbox terms, making the final addition operation seamless, enabling Core Sbox Unit 120 to generate the value "m$^{49}$(x+x$^9$+x$^{13}$+x$^{15}$+x$^{33}$+x$^{41}$+x$^{45}$+x$^{47}$+x$^{49}$)". The term "(x+x$^9$+x$^{13}$+x$^{15}$+x$^{33}$+x$^{41}$+x$^{45}$+x$^{47}$+x$^{49}$)" may also be referred to as "Y" for short.

Accordingly, as illustrated, the output from Core Sbox Unit 120 may be referred to as "M2A$_H^{49}$Y". For purposes of this disclosure, the "Y" component of the output may be referred to as the "original data" or "raw content", and the "M2A$_H^{49}$" component may be referred to as the "scaling factor." Thus, Core Sbox Unit 120 generates output which constitutes raw content that has been scaled by the 49$^{th}$ power of (the high-order nibble of) the multiplicative mask.

Referring again to FIG. 3, Byte Processing Unit 110A then uses an Adding Unit 134, a Multiplying Unit 136, a Mask Scaling and Inversion Unit 138, and Mask Compensation Unit 130 to replace that multiplicative scaling factor with an additive mask, as described in greater detail below. For instance, Mask Scaling and Inversion Unit 138 generates the inverse of the scaling factor (i.e., $M2A_H^{-49}$) to be used as a compensating factor. Accordingly, $M2A_H^{-49}$ may also be referred to as an "inverse compensating factor."

However, to prevent the raw content from being exposed, Byte Processing Unit 110A first uses Adding Unit 134 to apply an additive mask (referred to herein as "M3") to the output from Core Sbox Unit 120 (i.e., $M2A_H^{49}Y$). As illustrated, Adding Unit 134 receives M3 from Mask Compensation Unit 130. In particular, Mask Compensation Unit 130 computes M3 as "($M2A_H^{50}$, $M2A_H^{49}M2A_L$)", based on M2A and on factors from CFG 132. In other words, Mask Compensation Unit 130 converts M2A from a multiplicative mask ($M2A_H$) into the additive mask M3. As shown in FIG. 3, M3 may also be represented as "$M2A_H^{49}(M2A_H, M2A_L)$" or "$M2A_H^{49}(M2A)$". Accordingly, the additive mask M3 constitutes a scaled version of the multiplicative mask M2A.

Furthermore, as illustrated, the "$M2A_H^{49}Y$" output from Core Sbox Unit 120 may also be represented as "$M2A_H^{49}(Y_H,Y_L)$". Accordingly, Adding Unit 134 generates additively masked output that constitutes "$M2A_H^{49}(Y_H,Y_L)$+$M2A_H^{49}(M2A_H, M2A_L)$", which may also be represented as "$M2A_H^{49}((Y_H,Y_L)+(M2A_H, M2A_L))$" or "$M2A_H^{49}(Y+M2A)$".

Multiplying Unit 136 then applies the compensating factor from Mask Scaling and Inversion Unit 138 (i.e., the scaling factor $M2A_H^{-49}$) to the output from Adding Unit 134, producing the additively masked value "Y+M2A." Thus, as has been described, Byte Processing Unit 110A applies a scaled version of the multiplicative mask as an additive mask prior to applying the inverse compensation factor, to ensure that Sbox data is always masked throughout all processing steps. The Sbox output is finally available in additively-masked format in $GF(2^4)^2$. Since the "Y+M2A" output from Multiplying Unit 136 additively masked, that output may also be referred to as "$AMC2_{CF}$" (with the "2" serving to distinguish this value from the $AMC_{NF}$ value generated by Matrix Mapper 210A in FCMU 114).

Field Converter 140 then converts $AMC2_{CF}$ from the composite field to the native field. Accordingly, the output from Field Converter 140 may be referred to as "$AMC2_{NF}$" (with the "2" serving to distinguish this value from the $AMC_{NF}$ value received by Byte Processing Unit 110A). In one embodiment, Field Converter 140 uses a pair of inverse mapping matrices to convert the operands of $AMC2_{CF}$ from the composite field to the native field. As illustrated, $AMC2_{NF}$ may also be referred to as "$R3I_0$".

Referring again to FIGS. 1 and 2, FSM 46 may then store $R3I_0$ in R3, along with $R3I_1$, $R3I_2$, and $R3I_3$, which may be generated by Byte Processing Units 110B-110C using the same kinds of techniques as those used by Byte Processing Unit 110A.

In addition, Field Converter 140 receives M2A from MMG 84 and generates a compensatory mask ("M2B") for $M2B_{NF}$, based on M2A. For instance, Field Converter 140 may split M2A into a high-order nibble $M2A_H$ and a low-order nibble $M2A_L$, and those two nibbles may be referred to collectively as $M2A_{CF}$. Field Converter 140 may then use a pair of inverse mapping matrices (like the pair used to convert $AMC2_{CF}$ into $AMC2_{NF}$) to convert $M2A_{CF}$ into $M2B_{NF}$, which belong to the native field of $GF(2^8)$. Field Converter 140 may then store $M2B_{NF}$ in mask register 150. Cipher block 42 may subsequently use $M2B_{NF}$ to compensate for the mask $AMC2_{NF}$. For instance, referring again to FIG. 1, in the next cycle, when FSM 46 receives the next "S5" value from $S_5$, FSM 46 may use $M2B_{NF}$ to compensate for the mask in R3, in conjunction with XORing the output of R3 with S5 at XOR element 62.

Since cipher block 42 consumes and generates data in the $GF(2^8)$ domain in additive masking format, in one embodiment or scenario, such a cipher block may be used as a black-box replacement for an unprotected cipher block in an encryption accelerator that is based on the SNOW process, with few if any modifications needed to other parts of the encryption accelerator.

As has been described, a data processing system may include technology for generating a keystream while combatting side-channel attacks. In particular, the data processing system may include cipher block which uses one or more masks to combat side-channel attacks based on power analysis. In one embodiment, those masks include an additive mask and a multiplicative mask.

Although certain example embodiments are described herein, one of ordinary skill in the art will understand that those example embodiments may easily be divided, combined, or otherwise altered to implement additional embodiments. Thus, the present teachings are not limited to the embodiments and/or scenarios described herein, but may be used to advantage in a wide variety of embodiment and scenarios. For instance, in another embodiment or scenario, a data processing system may be configured to use a multiplicative mask but not an additive mask. In another embodiment, one or more MMGs for generating the multiplicative masks may reside outside of the Byte Processing Units. For instance, a single MMG within Sbox SB or outside of Sbox SB may supply multiplicative masks to all of the Byte Processing Units.

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, as described above, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a machine-accessible medium or a machine-readable medium. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices. Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, dynamic RAM, static RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that some or all of the components depicted herein represent functional elements that are reasonably self-contained so that each can be designed, constructed, or updated substantially independently of the others. In some embodiments, the components may be implemented as hardware, software, or combinations of hardware and software for providing the functionality described and illustrated herein. For instance, in some embodiments, some or all of the control logic for implementing the described operations may be implemented in hardware logic (e.g., as microcode in an integrated circuit chip, as a programmable gate array (PGA), as an application-specific integrated circuit (ASIC), etc.). In addition or alternatively, some or all of the control logic for implementing the described operations may be implemented in software or firmware.

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered. Embodiments of technology for generating a keystream include the following examples:

Example A1 is an integrated circuit with technology for generating a keystream. The integrated circuit comprises a cipher block comprising an LFSR and an FSM, wherein the LFSR and the FSM are configured to generate a stream of keys, based on an initialization value and an initialization key. The integrated circuit also comprises an Sbox in the FSM, wherein the SBox is configured to use a multiplicative mask to mask data that is processed by the Sbox when the LFSR and the FSM are generating the stream of keys.

Example A2 is an integrated circuit according to Example A1, further comprising a core Sbox unit in the Sbox; and multiple FMAs in the core Sbox unit, wherein each FMA is configured (a) to receive a first pair of input values and a second pair of input values, and (b) to generate an output value comprising a sum of (i) a first product of the first pair of input values and (ii) a second product of the second pair of input values.

Example A3 is an integrated circuit according to Example A2, wherein the core Sbox unit is configured to (a) generate intermediate results using a working polynomial $g49(x)=x+x^9+x^{13}+x^{15}+x^{33}+x^{41}+x^{47}+x^{49}$; and (b) reduce the intermediate results to 8-bit values using a reduction polynomial of $x^8+x^6+x^5+x^3+1$; where "+" denotes a bitwise XOR operation.

Example A4 is an integrated circuit according to Example A1, further comprising a byte processing unit in the Sbox; and an FCMU in the byte processing unit, wherein the FCMU is configured to convert additively masked content in a native field to multiplicatively masked content in a composite field without unmasking the additively masked content. Example A4 may also include the features of any one or more of Examples A2-A3.

Example A5 is an integrated circuit according to Example A4, further comprising a field converter in the byte processing unit, wherein the field converter is configured to convert additively masked content in a composite field to additively masked content in a native field.

Example A6 is an integrated circuit according to Example A1, further comprising an AMG in the cipher block configured to generate an additive mask; and an XOR element in the cipher block configured to (a) receive the additive mask from the AMG (b) receive an input value from the LFSR, and (c) generate additively masked content, based on the input value from the LFSR and the additive mask. Example A6 may also include the features of any one or more of Examples A2-A5.

Example A7 is an integrated circuit according to Example A6, further comprising a byte processing unit in the Sbox; and an FCMU in the byte processing unit, wherein the FCMU is configured to convert additively masked content in a native field to multiplicatively masked content in a composite field unmasking the additively masked content.

Example A8 is an integrated circuit according to Example A6, wherein the XOR element comprises a first XOR element, the integrated circuit further comprising a CMG in the cipher block configured to generate a compensatory mask, based on the additive mask; and a second XOR element in the cipher block configured to (a) receive the compensatory mask from the CMG (b) receive an additively masked input value, and (c) generate unmasked content, based on the compensatory mask and the additively masked input value. Example A8 may also include the features of Example A7.

Example A9 is an integrated circuit according to Example A1, further comprising registers R1, R2, and R3 in the FSM; and wherein the Sbox is configured to receive input from register R2 and send output to register R3. Example A9 may also include the features of any one or more of Examples A2-A8.

Example A10 is an integrated circuit according to Example A1, wherein the integrated circuit comprises a processor comprising a cipher block according to claim 1; and at least one processor core, wherein the cipher block is responsive to the processing core. Example A10 may also include the features of any one or more of Examples A2-A9.

Example A11 is a data processing system with technology for generating a keystream according to claim 1. The data processing system comprises at least one processor core; a cipher block according to claim 1 responsive to the processor core; and an input/output module responsive to the processor core. Example A11 may also include the features of any one or more of Examples A2-A10.

Example A12 is a data processing system according to Example A11, wherein the integrated circuit comprises the at least one processor core and the cipher block.

Example A13 is a data processing system according to Example A11, wherein the integrated circuit with the cipher block comprises a security accelerator; and the at least one processor core resides on a second integrated circuit. Example A13 may also include the features of Example A12.

Example B1 is at least one non-transitory machine-accessible medium comprising computer instructions for generating a keystream. The computer instructions, when executed on a data processing system, enable the data processing system to (a) instantiate an FSM that comprises an Sbox: and (b) use a multiplicative mask to mask data that is processed by the Sbox when the FSM is being used to generate a stream of keys.

Example B2 is at least one machine-accessible medium according to Example B1, wherein the instructions, when executed, further enable the data processing system to instantiate a core Sbox unit; and instantiate multiple FMAs for the core Sbox unit, wherein each FMA is configured (a) to receive a first pair of input values and a second pair of input values, and (b) to generate an output value comprising a sum of (i) a first product of the first pair of input values and (ii) a second product of the second pair of input values.

Example B3 is at least one machine-accessible medium according to Example B1, wherein the instructions, when executed, further enable the data processing system to instantiate a byte processing unit for the Sbox and an FCMU for the byte processing unit, wherein the FCMU is configured to convert additively masked content in a native field to multiplicatively masked content in a composite field without unmasking the additively masked content. Example B3 may also include the features of Example B2.

Example C1 is a method for generating a keystream. The method comprises using an LFSR and an FSM to generate a stream of keys, based on an initialization value and an initialization key. Also, the operation of using the FSM to generate the stream of keys comprises using an Sbox to generate a second intermediate value, based on a first intermediate value, and the operation of using the Sbox to generate the second intermediate value comprises using a multiplicative mask to mask data that is processed by the Sbox.

Example C2 is a method according to Example C1, further comprising using at least one FMA in a core Sbox unit in the Sbox to (a) to receive a first pair of input values and a second pair of input values, and (b) generate an output value comprising a sum of (i) a first product of the first pair of input values and (ii) a second product of the second pair of input values.

Example C3 is a method according to Example C1, further comprising using an FCMU in a byte processing unit in the Sbox to convert additively masked content in a native field to multiplicatively masked content in a composite field without unmasking the additively masked content. Example C3 may also include the features of Example C2.

Example C4 is a method according to Example C3, further comprising using a field converter in the byte processing unit to convert additively masked content in a composite field to additively masked content in a native field.

In view of the wide variety of useful permutations that may be readily derived from the example embodiments described herein, this detailed description is intended to be illustrative only, and should not be taken as limiting the scope of coverage.

What is claimed is:

1. An integrated circuit with technology for generating a keystream, the integrated circuit comprising:
 a cipher block in the integrated circuit, the cipher block comprising a linear feedback shift register (LFSR) and a finite state machine (FSM), wherein the LFSR and the FSM are configured to generate a stream of keys, based on an initialization value and an initialization key;
 an Sbox in the FSM, wherein the SBox is configured to receive an additively masked version of content from the LFSR; and
 a fused conversion-and-masking unit (FCMU) in the Sbox, wherein the FCMU is configured to convert the additively masked version of content from the LFSR to a multiplicatively masked version of content from the LFSR.

2. An integrated circuit according to claim 1, further comprising:
 a core Sbox unit in the Sbox; and
 multiple fused multiplier-adders (FMAs) in the core Sbox unit, wherein each FMA is configured (a) to receive a first pair of input values and a second pair of input values, and (b) to generate an output value comprising a sum of (i) a first product of the first pair of input values and (ii) a second product of the second pair of input values.

3. An integrated circuit according to claim 2, wherein the core Sbox unit is configured to:
 generate intermediate results using a working polynomial $g49(x)=x+x^9+x^{13}+x^{15}+x^{33}+x^{41}+x^{47}+x^{49}$; and
 reduce the intermediate results to 8-bit values using a reduction polynomial of $x^8+x^6+x^5+x^3+1$;
 where "+" denotes a bitwise XOR operation.

4. An integrated circuit according to claim 1, further comprising:
 a byte processing unit in the Sbox, the byte processing unit comprising the FCMU; and
 wherein the FCMU is configured to convert the additively masked version of content from the LFSR to multiplicatively masked content without unmasking the additively masked version of content from the LFSR.

5. An integrated circuit according to claim 4, wherein:
 the FCMU is configured to convert the additively masked version of content from the LFSR in a native field to multiplicatively masked content in a composite field; and
 the byte processing unit comprises a field converter configured to convert additively masked content in a composite field to additively masked content in a native field.

6. An integrated circuit according to claim 1, further comprising:
 an additive mask generator (AMG) in the cipher block configured to generate an additive mask; and
 an XOR element in the cipher block configured to (a) receive the additive mask from the AMG (b) receive an input value from the LFSR, and (c) generate additively masked content, based on the input value from the LFSR and the additive mask.

7. An integrated circuit according to claim 1, wherein:
 the multiplicatively masked version of content from the LFSR comprises a first multiplicatively masked version of content from the LFSR; and
 the Sbox is configured to (a) use a sequence of squaring elements to generate a second multiplicatively masked version of content from the LFSR, based on the first multiplicatively masked version of content from the LFSR, and (b) produce additively masked output, based on the second multiplicatively masked version of content from the LFSR.

8. An integrated circuit according to claim 1, further comprising:
 a compensatory mask generator (CMG) in the cipher block configured to generate a compensatory mask, based on an additive mask; and
 an XOR element in the cipher block configured to (a) receive the compensatory mask, (b) receive an additively masked input value, and (c) generate unmasked content, based on the compensatory mask and the additively masked input value.

9. An integrated circuit according to claim 1, further comprising:
 registers R1, R2, and R3 in the FSM; and
 wherein the Sbox is configured to receive input from register R2 and send output to register R3, wherein the input from register R2 comprises the additively masked version of content from the LFSR, and the output to register R3 comprises the additively masked output of the Sbox.

10. An integrated circuit according to claim 1, wherein the integrated circuit comprises a processor comprising:
 at least one processor core; and
 the cipher block, wherein the cipher block is responsive to the processor core.

11. A data processing system with technology for generating a keystream according to claim 1, the data processing system comprising:
 at least one processor core;
 the cipher block, wherein the cipher block is responsive to the processor core; and
 an input/output module responsive to the processor core.

12. A data processing system according to claim 11, wherein the integrated circuit comprises the at least one processor core and the cipher block.

13. A data processing system according to claim 11, wherein:
 the integrated circuit with the cipher block comprises a security accelerator; and
 the at least one processor core resides on a second integrated circuit.

14. At least one non-transitory machine-accessible medium comprising computer instructions for generating a keystream, wherein the computer instructions, when executed on a data processing system, enable the data processing system to:
 instantiate a finite state machine (FSM) that comprises an Sbox; and
 use the FSM and a linear feedback shift register (LFSR) in the data processing system to generate a stream of keys based on an initialization value and an initialization key, wherein the operation of using the FSM and the LFSR to generate a stream of keys based on an initialization value and an initialization key comprises:
 receiving, at the Sbox, an additively masked version of content from the LFSR;
 at the Sbox, converting the additively masked version of content from the LFSR to a first multiplicatively masked version of content from the LFSR; and
 at the Sbox, (a) using a sequence of squaring elements to generate a second multiplicatively masked version of content from the LFSR, based on the first multiplicatively masked version of content from the LFSR, and (b) producing additively masked output, based on the second multiplicatively masked version of content from the LFSR.

15. At least one machine-accessible medium according to claim 14, wherein the instructions, when executed, further enable the data processing system to:
generate a compensatory mask, based on an additive mask; and
generate unmasked content, based on the compensatory mask and an additively masked input value.

16. At least one machine-accessible medium according to claim 14, wherein the instructions, when executed, further enable the data processing system to:
instantiate a fused conversion-and-masking unit (FCMU) for the Sbox, wherein the FCMU is configured to convert the additively masked version of content from the LFSR to multiplicatively masked content without unmasking the additively masked version of content from the LFSR.

17. A method for generating a keystream, the method comprising:
using a linear feedback shift register (LFSR) and a finite state machine (FSM) to generate a stream of keys, based on an initialization value and an initialization key; and
wherein the operation of using the LFSR and the FSM to generate the stream of keys comprises:
at an Sbox in the FSM, receiving an additively masked version of content from the LFSR;
at the Sbox, converting the additively masked version of content from the LFSR to a first multiplicatively masked version of content from the LFSR; and
at the Sbox, (a) using a sequence of squaring elements to generate a second multiplicatively masked version of content from the LFSR, based on the first multiplicatively masked version of content from the LFSR, and (b) producing additively masked output, based on the second multiplicatively masked version of content from the LFSR.

18. A method according to claim 17, further comprising: using at least one fused multiplier-adder (FMA) in a core Sbox unit in the Sbox to (a) receive a first pair of input values and a second pair of input values, and (b) generate an output value comprising a sum of (i) a first product of the first pair of input values and (ii) a second product of the second pair of input values.

19. A method according to claim 17, wherein the operation of converting the additively masked version of content from the LFSR to a first multiplicatively masked version of content from the LFSR comprises:
using a fused conversion-and-masking unit (FCMU) in the Sbox to convert the additively masked version of content from the LFSR in a to multiplicatively masked content unmasking the additively masked version of content from the LFSR.

20. A method according to claim 19, wherein:
the additively masked version of content from the LFSR is in a native field;
the FCMU converts the additively masked version of content from the LFSR in the native field to multiplicatively masked content in a composite field; and
the method further comprises converting additively masked content in a composite field to additively masked content in a native field.

* * * * *

UNITED STATES PATENT AND TRADEMARK OFFICE
CERTIFICATE OF CORRECTION

| | |
|---|---|
| PATENT NO. | : 11,695,542 B2 |
| APPLICATION NO. | : 16/288536 |
| DATED | : July 4, 2023 |
| INVENTOR(S) | : Sudhir Satpathy, Vikram Suresh and Sanu Mathew |

It is certified that error appears in the above-identified patent and that said Letters Patent is hereby corrected as shown below:

In the Claims

Column 17:
Lines 52-53, "in a composite field to additively masked content in a" should be --in the composite field to additively masked content in the--.

Column 19:
Lines 24-31,
"using a linear feedback shift register (LFSR) and a finite state machine (FSM) to generate a stream of keys, based on an initialization value and an initialization key; and
wherein the operation of using the LFSR and the FSM to generate the stream of keys comprises: at an Sbox in the FSM, receiving an additively masked version of content from the LFSR;" should be
--in a data processing system, instantiating a finite state machine (FSM) that comprises an Sbox; and
using the FSM and a linear feedback shift register (LFSR) in the data processing system to generate a stream of keys, based on an initialization value and an initialization key, wherein the operation of using the FSM and the LFSR to generate a stream of keys based on an initialization value and an initialization key comprises:
receiving, at the Sbox, an additively masked version of content from the LFSR;--.

Column 20:
Line 21, "in a" should be --in the--;

Column 20:
Lines 31-32, "in a composite field to additively masked content in a" should be --in the composite field to additively masked content in the--.

Signed and Sealed this
First Day of August, 2023

Katherine Kelly Vidal
*Director of the United States Patent and Trademark Office*